(12) United States Patent
Ogawa

(10) Patent No.: US 10,637,311 B2
(45) Date of Patent: Apr. 28, 2020

(54) ROTOR AND MOTOR

(71) Applicant: FANUC CORPORATION, Yamanashi (JP)

(72) Inventor: Yuuki Ogawa, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 0 days.

(21) Appl. No.: 16/114,061

(22) Filed: Aug. 27, 2018

(65) Prior Publication Data
US 2019/0097480 A1 Mar. 28, 2019

(30) Foreign Application Priority Data
Sep. 27, 2017 (JP) .................... 2017-185889

(51) Int. Cl.
*H02K 1/28* (2006.01)
*H02K 1/27* (2006.01)
*H02K 1/30* (2006.01)
*H02K 7/00* (2006.01)

(52) U.S. Cl.
CPC ............ *H02K 1/2773* (2013.01); *H02K 1/28* (2013.01); *H02K 1/30* (2013.01); *H02K 7/003* (2013.01)

(58) Field of Classification Search
CPC ......... H02K 1/2773; H02K 1/30; H02K 7/003
USPC ....................... 310/216.001, 261.1
See application file for complete search history.

(56) References Cited

U.S. PATENT DOCUMENTS

2011/0074242 A1* 3/2011 Singhal .................. H02K 1/22
310/216.058

FOREIGN PATENT DOCUMENTS

| CN | 102005842 A | 4/2011 |
| JP | S56-156346 U | 11/1981 |
| JP | S62-268330 A | 11/1987 |
| JP | H04-178131 A | 6/1992 |
| JP | H11-234928 A | 8/1999 |
| JP | 2012-044864 A | 3/2012 |
| JP | 2016-163468 A | 9/2016 |
| WO | 89/04078 A1 | 5/1989 |

OTHER PUBLICATIONS http://www.gcsescience.com/pme5.htm, 2014, GCSE Science (Year: 2014).*
Office Action issued in JP 2017-185889; mailed by the Japanese Patent Office dated Jun. 11, 2019.
(Continued)

*Primary Examiner* — Terrance L Kenerly
(74) *Attorney, Agent, or Firm* — Studebaker & Brackett PC

(57) ABSTRACT

A rotor of the present invention includes: a tube-shaped rotor core which is formed by stacking disc-shaped electromagnetic steel plates in layers, which is fixed to a rotary axis and which includes a plurality of through holes that are spaced in a circumferential direction of the rotor core and that penetrate along an axis direction of the rotary axis; and tie rods which are respectively press-fitted into the through holes, where the tie rods are formed with a plurality of rod-shaped members which are arranged in series along the axis direction, and there is no possibility that the positions of slits in the axis direction between the rod-shaped members adjacent in the axis direction coincide with each other in all the tie rods.

4 Claims, 4 Drawing Sheets

(56) References Cited

OTHER PUBLICATIONS

An Office Action mailed by the State Intellectual Property Office of the People's Republic of China dated Sep. 18, 2019, which corresponds to Chinese Patent Application No. 201811116900.7 and is related to U.S. Appl. No. 16/114,061; with English language translation.
An Office Action mailed by the German Patent Office dated Feb. 13, 2020, which corresponds to German Patent Application No. 10 2018 006 242.3 and is related to U.S. Appl. No. 16/114,061; with partial English language translation.

* cited by examiner

ROTOR AND MOTOR

This application is based on and claims the benefit of priority from Japanese Patent Application No. 2017-185889, filed on 27 Sep. 2017, the content of which is incorporated herein by reference.

BACKGROUND OF THE INVENTION

Field of the Invention

The present invention relates to rotors and motors.

Related Art

Conventionally, as a rotor in a motor, a rotor is known where a rotor core in which annular (disc-shaped, circular plate-shaped) electromagnetic steel plates are stacked in layers in an axis direction and end plates which are arranged at both ends thereof are fixed to a rotary axis. The electromagnetic steel plates and the end plates of the rotor core include, in a plurality of places spaced in a circumferential direction, through holes which penetrate in the axis direction, and pins are press-fitted into the through holes so as to be coupled thereto (see, for example, patent document 1).

The end plates are utilized to increase the strength of the rotor and to couple to the rotary axis and the like. The pins which are longer than the rotor core are used, and thus when the motor outputs torque, the rotor is prevented from being broken by the reaction of the torque.

Patent Document 1: Japanese Unexamined Patent Application, Publication No. 2016-163468

SUMMARY OF THE INVENTION

Although when a rotor core is long, pins which are longer than the rotor core are needed, pins which are standard products cannot be applied, with the result that a rotor is expensive.

An object of the present invention is to provide a rotor and a motor in which pins that are standard products are easily applied.

(1) The present invention relates to a rotor (for example, a rotor 10 which will be described later) including: a tube-shaped rotor core (for example, a rotor core 12 which will be described later) which is formed by stacking disc-shaped electromagnetic steel plates (for example, electromagnetic steel plates 121 which will be described later) in layers, which is fixed to a rotary axis (for example, a rotary axis 11 which will be described later) and which includes a plurality of through holes (for example, through holes 122 which will be described later) that are spaced in a circumferential direction (for example, a circumferential direction D2 which will be described later) of the rotor core and that penetrate along an axis direction (for example, an axis direction D1 which will be described later) of the rotary axis; and tie rods (for example, tie rods 14 and 15 which will be described later) which are respectively press-fitted into the through holes, where the tie rods are formed with a plurality of rod-shaped members (for example, rod-shaped members 141, 142, 151, 152 and 153 which will be described later) which are arranged in series along the axis direction, and there is no possibility that the positions of slits (for example, slits 140 and 150 which will be described later) in the axis direction between the rod-shaped members adjacent in the axis direction coincide with each other in all the tie rods.

(2) Preferably, in the rotor according to (1), there is no possibility that the positions of the slits in the axis direction coincide with each other in the tie rods adjacent in the circumferential direction.

(3) Preferably, in the rotor according to (2), in each of the tie rods, the lengths of the rod-shaped members are different from each other.

(4) A motor (for example, a motor 1 which will be described later) including: the rotor according to any one of (1) to (3); and a cylindrical stator (for example, a stator 20 which will be described later) which is arranged within the rotor.

According to the present invention, it is possible to provide a rotor and a motor in which pins that are standard products are easily applied.

DETAILED DESCRIPTION OF THE INVENTION

An embodiment of a rotor and a motor according to the present invention will be described below with reference to FIGS. 1 to 3.

Figure 1:
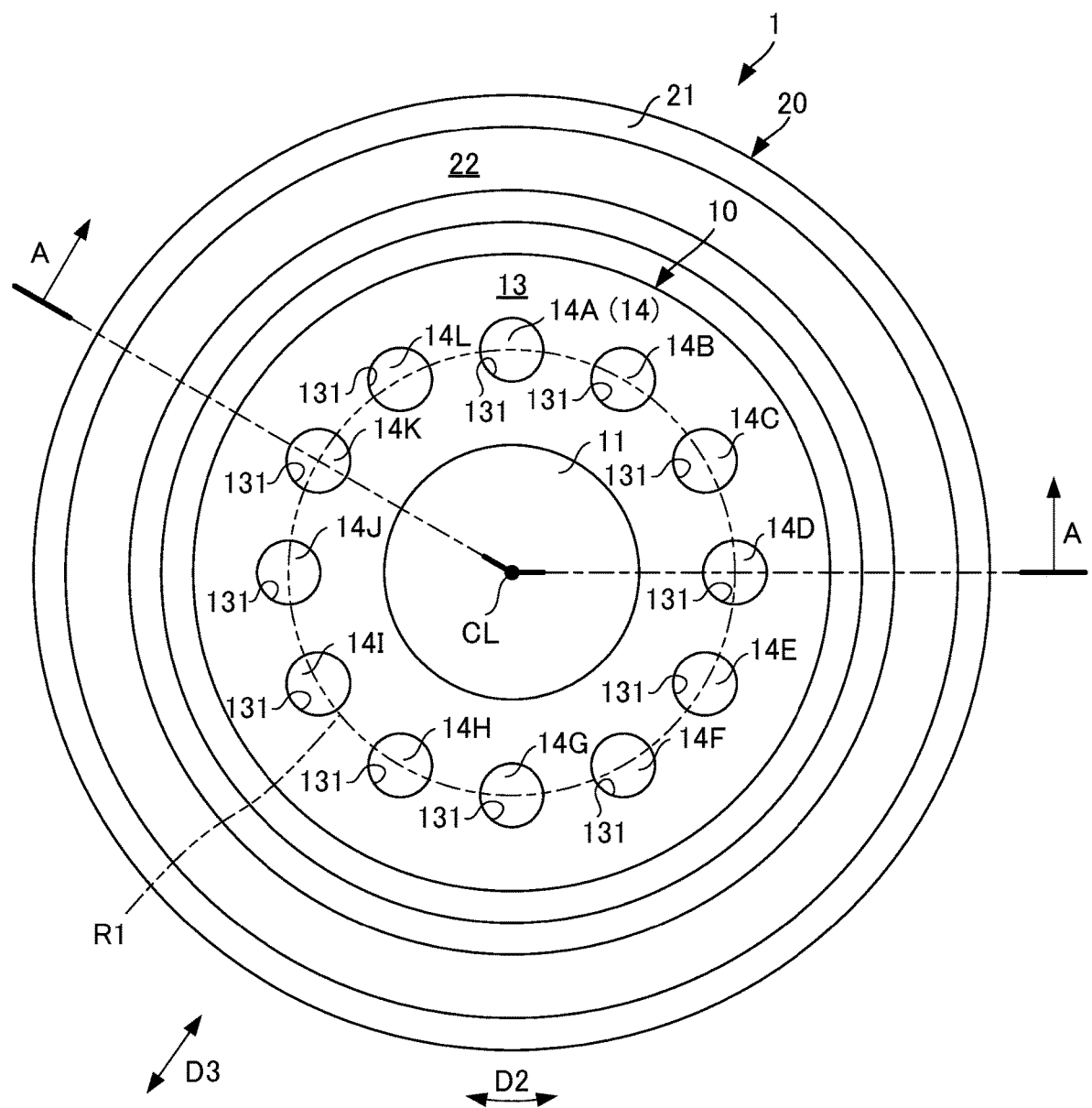
FIG. 1 is a front view showing a schematic configuration of a motor according to an embodiment of the present invention.

FIG. 1 is a front view showing a schematic configuration of a motor 1 according to an embodiment of the present invention. FIG. 2 is a cross-sectional view taken along line A-A in FIG. 1. FIG. 3 is a schematic view of a plurality of tie rods 14A to 14L included in a rotor 10.

Figure 2:
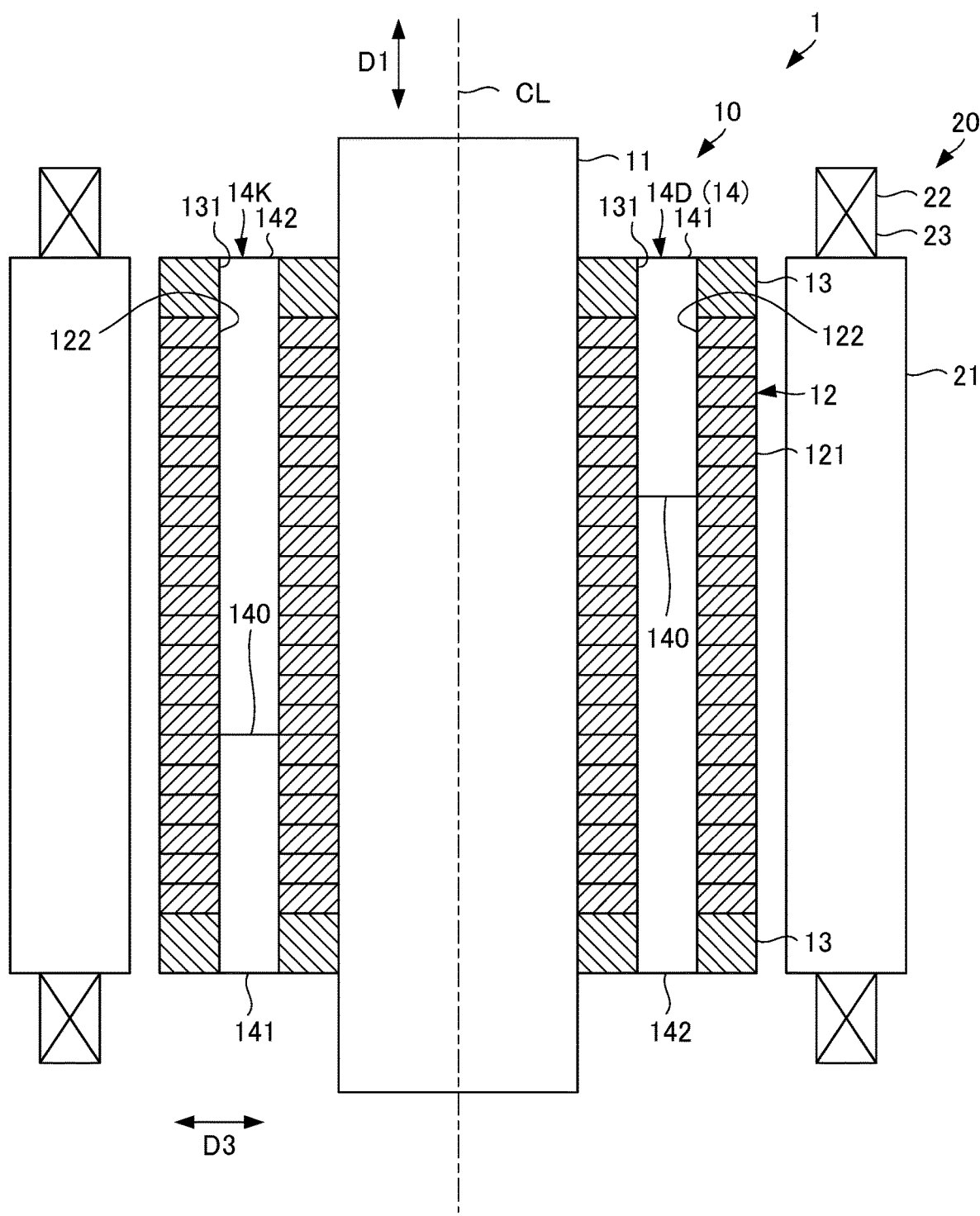
FIG. 2 is a cross-sectional view taken along line A-A in FIG. 1.
Figure 3:
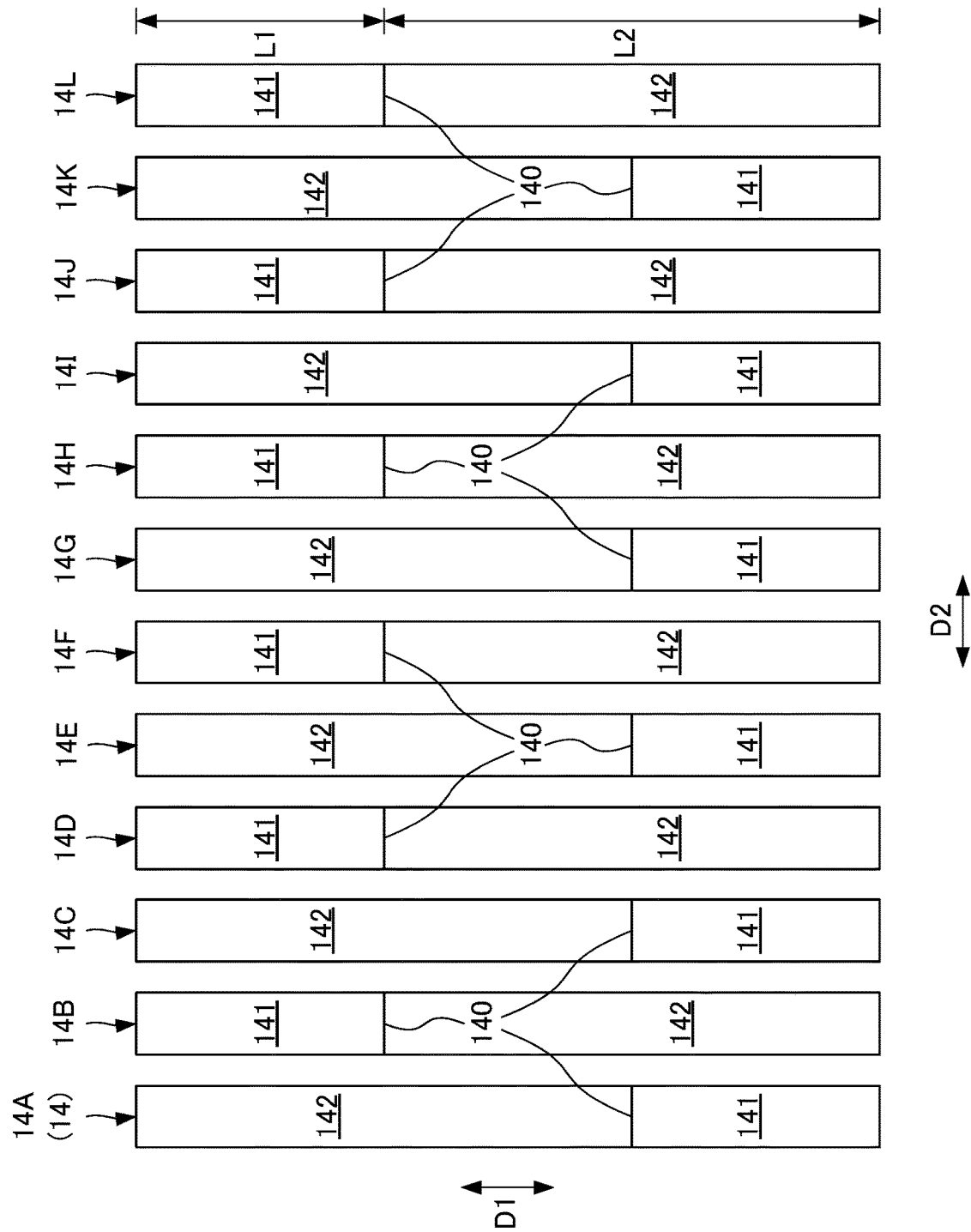
FIG. 3 is a schematic view of a plurality of tie rods included in a rotor.

The motor 1 of the present embodiment shown in FIGS. 1 and 2 includes the rotor 10 and a stator 20. The rotor 10 includes a rotary axis 11, a rotor core 12, a pair of end plates 13 and the tie rods 14A to 14L.

The rotary axis 11 is a rod-shaped body. The rotary axis 11 is supported, on both sides in an axis direction, through bearings (not shown), to the case (not shown) of the motor 1 such that the rotary axis 11 can be rotated. In other words, the rotary axis 11 can be rotated about an axis center. In FIG. 2, the axis center CL of the rotary axis 11 is indicated by an alternate long and short dashed line. In the following description, the axis direction of the rotary axis 11 is also simply referred to as the "axis direction D1".

The rotor core 12 is formed in the shape of a cylinder (tube) by stacking disc-shaped (annular, circular plate-shaped) electromagnetic steel plates 121 in layers in the axis direction D1. In the drawing, the thickness of the electromagnetic steel plates 121 is exaggerated and shown so as to be thicker than the actual thickness. The rotor core 12 is fixed to the outer circumferential surface of the rotary axis 11 arranged in a center portion in a radial direction D3. The rotor core 12 includes a plurality of through holes 122.

The through holes 122 are formed as holes which penetrate along the axis direction D1 from one end surface of the rotor core 12 toward the other end surface, and the through holes 122 have substantially the same cross-sectional area. The through holes 122 are spaced along the circumferential direction D2 of the rotor core 12. In other words, the through holes 122 are arranged on an imaginary circle R1 about the axis center CL (the rotation center of the rotor core 12) of the rotary axis 11 at substantially regular intervals. The "substantially regular intervals" include not only exactly regular intervals but also intervals which can be regarded as being functionally regular intervals (the same is true in the following description).

The end plates 13 are arranged at both ends in the axis direction D1 of the rotor core 12 so as to be formed in the shape of a cylinder (tube) together with the rotor core 12. The end plates 13 are fixed to the outer circumferential surface of the rotary axis 11 arranged in the center portion in the radial direction D3. The end plates 13 include a plurality of through holes 131.

A plurality of the through holes 131 is formed as holes which penetrate along the axis direction D1, and have substantially the same cross-sectional area. The through holes 131 are spaced along the circumferential direction D2 of the rotor core 12, and are continuous to the through holes 122 of the rotor core 12 in the axis direction D1. In other words, the through holes 131 are arranged on the imaginary circle R1 about the axis center CL (the rotation center of the rotor core 12) of the rotary axis 11 at substantially regular intervals.

In the individual through holes (131 and 122), the individual tie rods 14A to 14L are press-fitted into the through holes 131 of the one end plate 13, the through holes 122 of the rotor core 12 and the through holes 131 of the other end plate 13 in this order. As shown in FIG. 3, each of the tie rods 14A to 14L is formed with a rod-shaped member 141 having a length L1 and a rod-shaped member 142 having a length L2 which are arranged in a series. When in particular, it is not necessary to distinguish the tie rods 14A to 14L, they are also simply referred to as the "tie rods 14". The tie rods 14 include slits 140 between the rod-shaped members 141 and 142 which are adjacent in the axis direction D1.

In the individual tie rods 14A to 14L, the lengths L1 of the rod-shaped members 141 and the lengths L2 of the rod-shaped members 142 are different from each other (the individual lengths are different from each other) such that the tie rods 14A to 14L having the slits 140 have a relationship of L1≠L2. There is no possibility that the positions of the slits 140 of the tie rods 14A to 14L in the axis direction D1 coincide with each other in all twelve tie rods 14A to 14L. There is also no possibility that the positions of the slits 140 of the tie rods 14A to 14L in the axis direction D1 coincide with each other in the tie rods 14 (for example, the tie rods 14A and 14B) adjacent in the circumferential direction D2.

The stator 20 is fixed to the case (not shown) of the motor 1. The stator 20 includes a stator core 21 and coils 22.

The stator core 21 is formed substantially in the shape of a cylinder. The stator core 21 is formed by stacking a plurality of electromagnetic steel plates in layers in the axis direction D1.

The coils 22 are wound around the stator core 21. The coils 22 are formed with, for example, U-phase, V-phase and W-phase coils 22. The parts of the coils 22 which are protruded on both sides in the axis direction D1 of the stator core 21 are assumed to be coil ends 23. In FIG. 1, a plurality of coils 22 are schematically and integrally shown in the shape of a cylinder.

In the rotor 10 and the motor 1 of the present embodiment, for example, the following effects are achieved. The rotor 10 of the present embodiment includes: the tube-shaped rotor core 12 which is formed by stacking the disc-shaped electromagnetic steel plates 121 in layers, which is fixed to the rotary axis 11 and which includes a plurality of through holes 122 that are spaced in the circumferential direction D2 of the rotor core 12 and that penetrate along the axis direction D1 of the rotary axis 11; and the tie rods 14 which are respectively press-fitted into the through holes 122. The tie rods 14 are formed with a plurality of rod-shaped members 141 and 142 which are arranged in series along the axis direction D1, and there is no possibility that the positions of the slits 140 in the axis direction D1 between the rod-shaped members adjacent in the axis direction D1 coincide with each other in all the tie rods 14.

Hence, in any position of the rotor core 12 in the axis direction D1, there is a part where the slits 140 of the tie rods 14A to 14L are not present. In this way, it is possible to reduce the breakage of the rotor core 12 in the position of the slits 140 due to the reaction of torque resulting from the rotation of the rotor 10. Although when the rotor core 12 is long, long pins are needed, short pins which are standard products and are inexpensive are arranged in series such that they can be applied. In other words, in the present embodiment, it is possible to provide the rotor 10 and the motor 1 in which pins that are standard products are easily applied.

There is also no possibility that the positions of the slits 140 in the axis direction D1 coincide with each other in the tie rods 14 adjacent in the circumferential direction D2. Hence, the reaction of the torque resulting from the rotation of the rotor 10 can be dispersed. In this way, it is possible to more reduce the breakage of the rotor core 12 in the position of the slits 140.

In each of the through holes 122, the lengths of the rod-shaped members 141 and 142 are different from each other. Hence, when the tie rods 14A to 14L are press-fitted, the order of the rod-shaped members 141 and 142 having different lengths L1 and L2 is changed, and thus it is possible to easily prevent the positions of the slits 140 included in the tie rods 14A to 14L in the axis direction D1 from coinciding with each other.

A motor 1 according to another embodiment serving as a variation will then be described with reference to FIG. 4. In the description of the variation, the same configurations as in the embodiment described above are, for example, identified with the same reference numerals, and thus the description thereof will be omitted. In the description of the variation, the description of the same effects as the effects achieved in the embodiment described above will be omitted.

Figure 4:
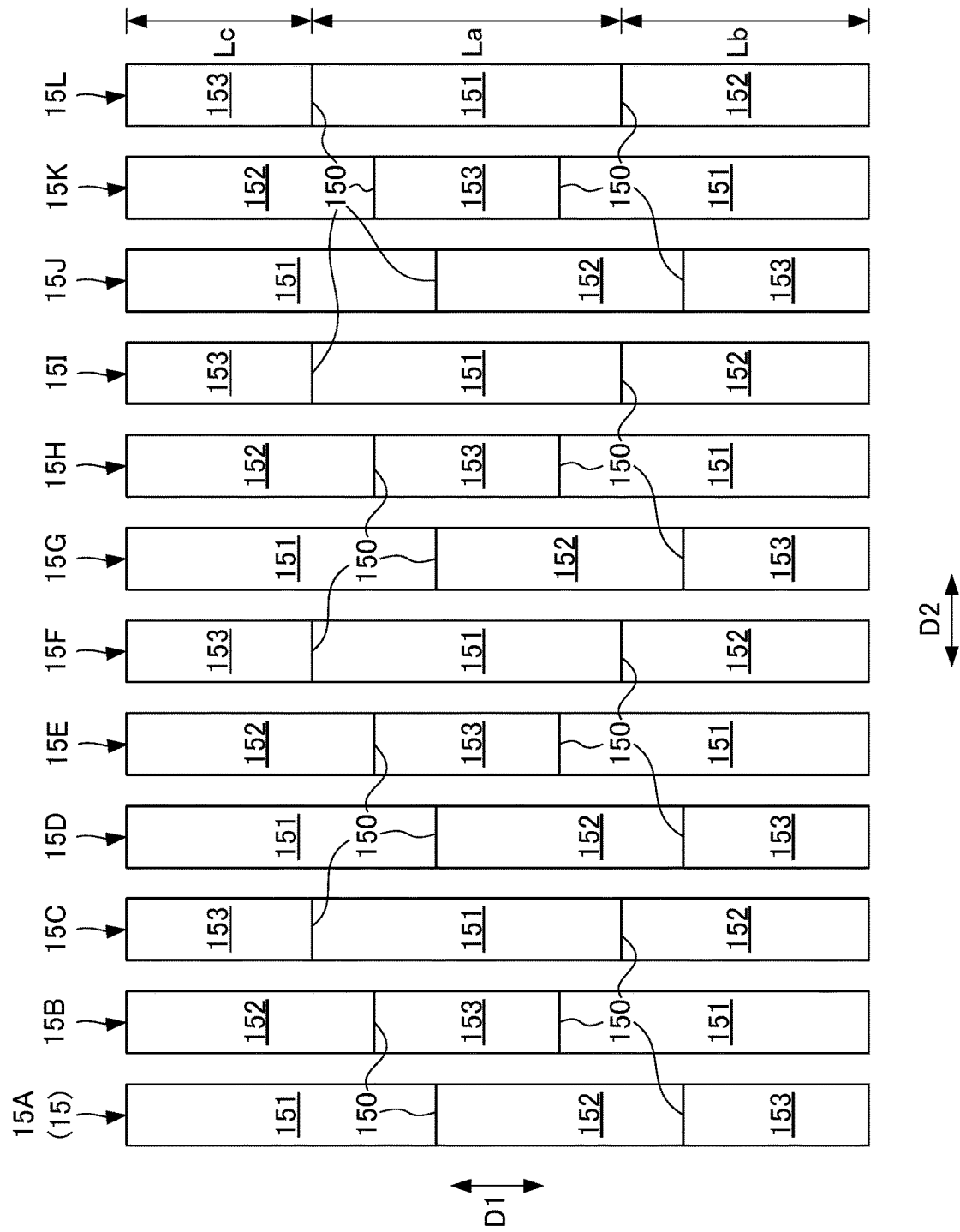
FIG. 4 is a schematic view of a plurality of tie rods included in a rotor according to another embodiment.

FIG. 4 is a schematic view of a plurality of tie rods 15A to 15L included in a rotor 10 according to another embodiment. The rotor 10 according to the present embodiment differs from the embodiment described above in that instead of the tie rods 14A to 14L, the tie rods 15A to 15L are included. When in particular, it is not necessary to distinguish the tie rods 15A to 15L, they are also simply referred to as the "tie rods 15".

The individual tie rods 15A to 15L are press-fitted into the through holes 131 of one end plate 13, the through holes 122 of a rotor core 12 and the through holes 131 of the other end plate 13 in this order. As shown in FIG. 4, each of the tie rods 15A to 15L is formed with a rod-shaped member 151 having a length La, a rod-shaped member 152 having a length Lb and a rod-shaped member 153 having a length Lc, in an arrangement in a series. The tie rods 15 include slits 150 and 150 between the rod-shaped members 151, 152 and 153 which are adjacent in the axis direction D1.

In the tie rods 15A to 15L having the slits 150, the length La of the rod-shaped members 151, the length Lb of the rod-shaped members 152 and the length Lc of the rod-shaped member 153 are different from each other. The individual lengths have a relationship of La≠Lb≠Lc, and also have relationships of La+Lb≠Lc, Lb+Lc≠La and Lc+La≠Lb. There is no possibility that the positions of the slits 150 of the tie rods 15A to 15L in the axis direction D1 coincide with each other in all twelve tie rods 15A to 15L. There is also no possibility that the positions of the slits 150 of the tie rods 15A to 15L in the axis direction D1 coincide with each other in the tie rods 15 (for example, the tie rods 15A, 15B and 15C) adjacent in the circumferential direction D2. In the twelve tie rods 15A to 15L, parts where the positions of the slits 150 of the tie rods 15A to 15L in the axis direction D1 are different are related to the number of types N (in the case of FIG. 4, N=3) of rod-shaped members, and thus the number of the parts is 12×(N−1/N). When the motor 1 generates torque, since the reaction of the torque applied to the slits 150 of the tie rods 15A to 15L is dispersed over the parts where the positions of the slits 150 of the tie rods 15A to 15L in the axis direction D1 are different, the number of types N of rod-shaped members is increased, with the result that it is possible to increase the lower limit value of the strength of the rotor core 12.

The present invention is not limited to the embodiments described above, and various modifications and variations are possible. For example, although in the embodiment described above, all the tie rods 14A to 14L have the slits 140, there is no limitation to this configuration. In other words, at least one of the tie rods 14A to 14L may have the slits 140. The tie rod may be formed with four or more (four or more types of) rod-shaped members. In each of the tie rods, the arrangement pattern of the lengths of the rod-shaped members can be changed as necessary. Although the position of end portions of the rod-shaped members in a longitudinal direction and a position in the direction of thickness of the electromagnetic steel plates coincide with each other in FIG. 2, there is no limitation to this configuration, and they do not need to coincide with each other.

EXPLANATION OF REFERENCE NUMERALS 1 motor
10 rotor
11 rotary axis
12 rotor core
14, 15 tie rod
20 stator
121 electromagnetic steel plate
122 through hole
140, 150 slit
141, 142, 151, 152, 153 rod-shaped member
D1 axis direction
D2 circumferential direction

What is claimed is:

1. A rotor comprising: a tube-shaped rotor core which is formed by stacking disc-shaped electromagnetic steel plates in layers, which is fixed to a rotary axis and which includes a plurality of through holes that are spaced in a circumferential direction of the rotor core and that penetrate along an axis direction of the rotary axis; and
   tie rods which are respectively press-fitted into the through holes,
   wherein the tie rods are formed with a plurality of rod-shaped members which are arranged in series along the axis direction, each of the through holes contains a same number of rod-shaped members, and the number of rod-shaped members in any through hole is either two or three, and
   there is no possibility that positions of slits in the axis direction between the rod-shaped members adjacent in the axis direction coincide with each other in all the tie rods.

2. The rotor according to claim 1, wherein there is no possibility that the positions of the slits in the axis direction coincide with each other in the tie rods adjacent in the circumferential direction.

3. The rotor according to claim 1, wherein in each of the tie rods, lengths of the rod-shaped members are different from each other.

4. A motor comprising: the rotor according to claim 1; and a cylindrical stator which is arranged within the rotor.

* * * * *